(12) United States Patent
Kim et al.

(10) Patent No.: US 7,138,734 B2
(45) Date of Patent: Nov. 21, 2006

(54) LINEAR DRIVE UNIT REDUCING STRESS GENERATED IN MOVABLE PART IN HORIZONTAL DIRECTION

(75) Inventors: Houng Joong Kim, Hitachi (JP); Kohji Maki, Hitachi (JP); Yasuo Morooka, Hitachi (JP); Isamu Numata, Juo (JP); Hisao Tadokoro, Hitachi (JP); Takeo Morimoto, Koshigaya (JP); Yasunori Sannohe, Hitachi (JP); Hiroshi Ueno, Takahagi (JP); Hideki Shimane, Mito (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 11/125,114

(22) Filed: May 10, 2005

(65) Prior Publication Data
US 2005/0200209 A1  Sep. 15, 2005

Related U.S. Application Data

(63) Continuation of application No. 10/821,911, filed on Apr. 12, 2004, now abandoned, which is a continuation of application No. 10/219,772, filed on Aug. 16, 2002, now abandoned.

(30) Foreign Application Priority Data

Feb. 20, 2002 (JP) .............................. 2002-042517

(51) Int. Cl.
*H02K 41/00* (2006.01)
(52) U.S. Cl. .............................. 310/12; 310/13; 310/14
(58) Field of Classification Search ............ 310/12–14, 310/90.5
See application file for complete search history.

(56) References Cited

U.S. PATENT DOCUMENTS

| | | | | |
|---|---|---|---|---|
| 3,277,322 A | * | 10/1966 | Berlincourt | ........... 310/40 MM |
| 3,353,131 A | * | 11/1967 | Stubbs et al. | ............... 336/130 |
| 4,254,350 A | * | 3/1981 | Miroshnichenko et al. | ... 310/13 |
| 4,945,268 A | | 7/1990 | Nihei et al. | |
| 5,605,100 A | * | 2/1997 | Morris et al. | ............... 104/284 |
| 5,661,350 A | | 8/1997 | Lucidarme et al. | |
| 5,982,065 A | | 11/1999 | Jamain et al. | |

(Continued)

FOREIGN PATENT DOCUMENTS

JP   10-174418   6/1998

(Continued)

OTHER PUBLICATIONS

J.R. Hendershot Jr. and T.J. E. Miller, 1994, Magna Physis. Div. Tridelta Industries, Inc., p. 3-1.

*Primary Examiner*—Darren Schuberg
*Assistant Examiner*—Yahveh Comas
(74) *Attorney, Agent, or Firm*—Dickstein Shapiro LLP

(57) ABSTRACT

In order to reduce load supported by a support mechanism for supporting a movable part so as to prevent the movable part from moving in a horizontal direction when stress is generated thereon in the horizontal direction, there is provided a drive unit including a primary side having a magnetic body around which a coil is wound, and a secondary side having a plurality of permanent magnets, the primary side including magnetic poles and step portions provided on the magnetic poles. The width of each step portion is smaller than the width of each permanent magnet.

3 Claims, 3 Drawing Sheets

U.S. PATENT DOCUMENTS

| | | |
|---|---|---|
| 6,448,733 B1 | 9/2002 | Joong et al. |
| 6,467,584 B1 | 10/2002 | Yamamoto et al. |
| 6,541,880 B1 * | 4/2003 | Okada et al. ............... 310/12 |
| 6,548,919 B1 * | 4/2003 | Maki et al. ............... 310/12 |
| 6,548,920 B1 * | 4/2003 | Joong et al. ............... 310/12 |
| 2002/0053835 A1 | 5/2002 | Joong et al. |

FOREIGN PATENT DOCUMENTS

| | | | |
|---|---|---|---|
| JP | 10-327571 A | | 12/1998 |
| JP | 10327571 A | * | 12/1998 |
| JP | 10336995 A | * | 12/1998 |
| JP | 2000-224828 | | 8/2000 |
| JP | 2001-28875 | | 1/2001 |
| JP | 2002-27729 | | 1/2002 |
| JP | 2002027731 A | * | 1/2002 |
| JP | A-2002-027729 | | 1/2002 |
| JP | A-2002-027731 | | 1/2002 |

* cited by examiner

LINEAR DRIVE UNIT REDUCING STRESS GENERATED IN MOVABLE PART IN HORIZONTAL DIRECTION

The present application is a continuation of application Ser. No. 10/821,911, filed Apr. 12, 2004, now abandoned which is a continuation of Ser. No. 10/219,772, filed Aug. 16, 2002, now abandoned the entire disclosures of which are incorporated herein by reference.

BACKGROUND OF THE INVENTION

1. Field of the Invention

The invention relates to a drive unit composed of a movable part and a stationary part.

2. Description of the Prior Art

In recent years, a demand for a drive unit utilizing linear drive as typified by a linear motor has increased. The linear motor has advantages in capability of high speed and high accuracy positioning and easy maintenance as compared with a rotary motor in the field where the linear drive is needed and thus, has been extremely demanded particularly in the field of a semiconductor manufacturing apparatus, a working machine or the like. However, not limited to the fields, it is also expected that the linear motor will be used in other applications in which the above advantages can be made use of.

There are various systems for the linear motor. For example, JP-A-10-174418 (referred below to as a conventional example 1) describes a linear motor in which a stationary part is composed of a plurality of C-type iron cores having a coil wound therearound, a movable part is composed of a plate-shaped member with a plurality of permanent magnets arranged thereon, and the movable part is disposed in a gap in the stationary part iron core. Further, JP-A-2001-28875 (referred below to as a conventional example 2) describes a linear motor in which only one coil is wound around a stationary part in order to achieve easy manufacturing and space saving and to improve electrical efficiency, and iron cores having two kinds of shapes are alternately arranged in the stationary part.

BRIEF SUMMARY OF THE INVENTION

In the case that the linear motors according to the above conventional examples are used in a working machine or the like, there has been a problem that load to be supported by a support mechanism is great for supporting a movable part so as to prevent the movable part from moving in a horizontal direction when stress is generated thereon in the horizontal direction, so that it is necessary to use a rigid member for the support mechanism.

Accordingly, an object of the invention is to decrease stress generated in a horizontal direction on a movable part of a drive unit, and to enable a simple support mechanism to be used for the movable part.

The invention is characterized in that a drive unit includes a primary side having a magnetic body around which a coil is wound, and a secondary side having a plurality of permanent magnets, an irregular magnetic plate or a conductor plate, wherein the primary side has a magnetic pole which has a step portion provided thereon.

The secondary side is disposed between opposed magnetic poles of the primary side. The step portion may be provided on at least one of the opposed magnetic poles. The step portion may be a protrusion protruding from the magnetic pole toward the secondary side. Preferably, the width of the protrusion is smaller than that of the secondary side, so that the width of magnetic flux flowing between the opposed magnetic poles becomes narrow. By this feature, a force which returns the secondary side toward a reference position, namely a restoring force can be enhanced.

A further feature of the invention is that a drive unit includes a first core having first opposed portions, a second core having second opposed portions, a primary side composed of the first core and the second core, around which primary side a coil is wound, and a secondary side disposed between the first opposed portions and between the second opposed portions, wherein the primary side has a step portion.

A still further feature of the invention is that a drive unit includes a first core having first opposed portions, a second core having second opposed portions, a primary side composed of the first core and the second core, around which primary side a coil is wound, and a secondary side disposed between the first opposed portions and between the second opposed portions, wherein a step portion is provided in at least one of the first opposed portions and the second opposed portions.

Other objects, features and advantages of the invention will become apparent from the following description of the embodiments of the invention taken in conjunction with the accompanying drawings.

In addition, other features of the invention will be also described in the claims of the invention.

DETAILED DESCRIPTION OF THE INVENTION

Figure 1A:
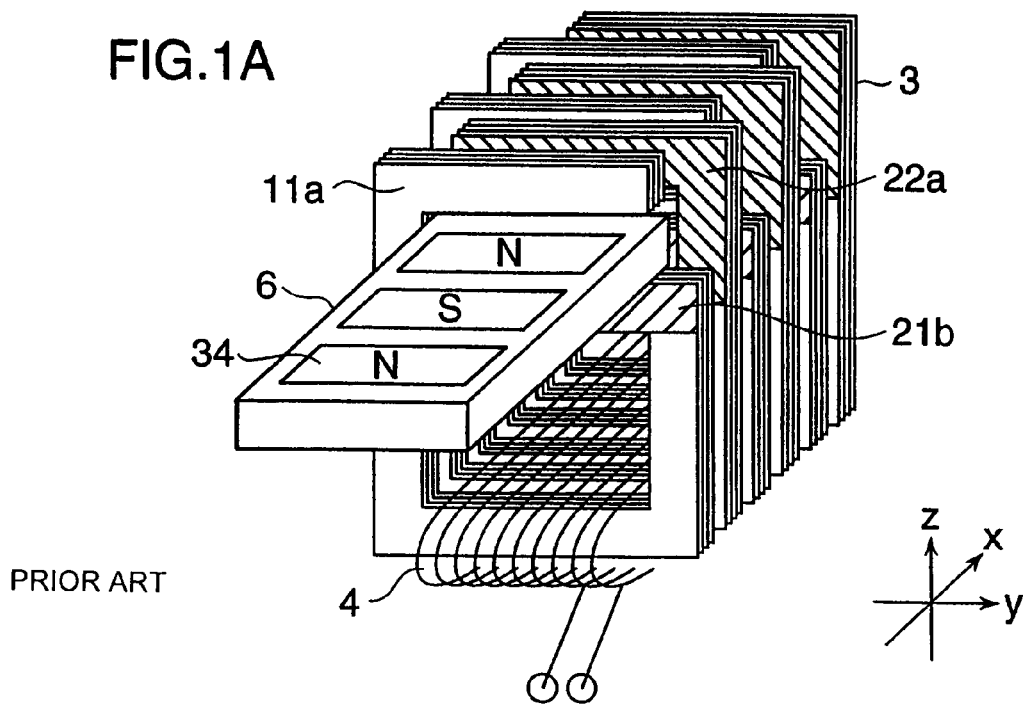
FIGS. 1A and 1B are views showing a construction of a linear motor according to a comparative example.
Figure 1B:
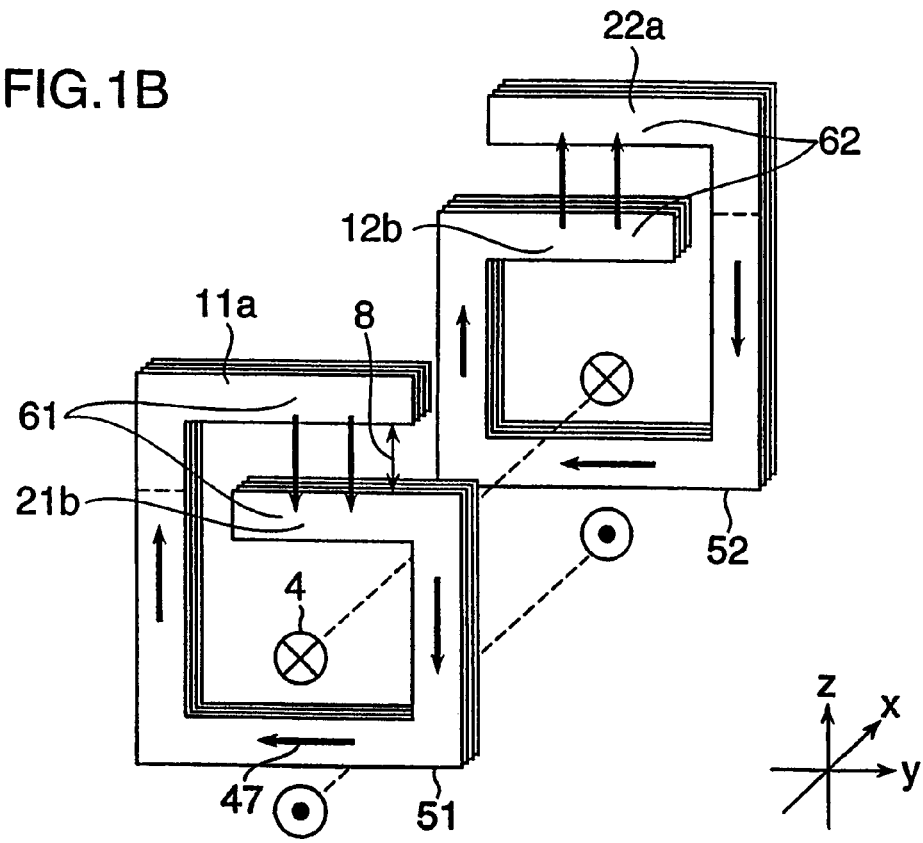

FIGS. 1A and 1B show a linear motor according to a comparative example. FIG. 1A is a view generally showing the linear motor, and FIG. 1B is a view showing flow of magnetic flux in the linear motor. In a movable part 6 corresponds to a secondary side of the linear motor, a plurality of permanent magnets 34 are arranged so that N poles and S poles are alternated. A stationary part 3, which corresponds to a primary side (a side having a magnetic body around which a coil is wound) of the linear motor, includes cores 51 and 52, and a coil 4 composed of a conductor. The first core 51 includes first opposed portions 61, and the second core 52 includes second opposed portions 62. The cores 51 and 52 are made of a magnetic body, and are disposed so that upper and lower magnetic poles are alternated. In the drawing, an upper magnetic pole tooth 11a and a lower magnetic pole tooth 21b of the core 51 are defined as the first opposed portions 61, and a lower magnetic pole tooth 12b and an upper magnetic pole tooth 22a of the core 52 are defined as the second opposed portions 62. Thus, the stationary part 3 is constructed such that a (2n−1)th core has the first opposed portions 61, and a (2n)th core has the second opposed portions 62 (where n=1, 2, 3, ... ). A predetermined gap 8 is provided between the upper magnetic pole tooth and the lower magnetic pole tooth of each opposed portions of the cores 51 and 52, through which gap 8 the movable part 6 is extended, so that the movable part 6 is movably supported between the first opposed portions 61 and between the second opposed portions 62. When single-phase alternating current is made to flow through the coil 4 in accordance with a relative position between the movable part 6 and the stationary part 3, magnetic fluxes pass alternately in an upper direction and a lower direction in the gaps 8 between the upper and lower magnetic pole teeth of the respective opposed portions of the linear motor, that is, the directions of the magnetic fluxes flowing through the first opposed portions 61 and the second opposed portions 62 are opposed (arrows 47 indicate the directions of the magnetic fluxes). By the interaction of the magnetic fluxes flowing through the first opposed portions 61 and the second opposed portions 62 and the magnetic flux created by the permanent magnets 34, drive force caused by electromagnetic force is generated in the movable part 6 in a x-direction, so that the movable part 6 can be reciprocated.

In the case that the linear motor according to the above comparative example is used for a working machine, there has been caused a problem that stress is generated in a y-direction of the movable part 6 due to shock or the like at the time of machining, which stress increase load applied on a support mechanism supporting the movable part 6 in the y-direction, so that the support mechanism must be manufactured to be rigid.

First Embodiment

Figure 2A:
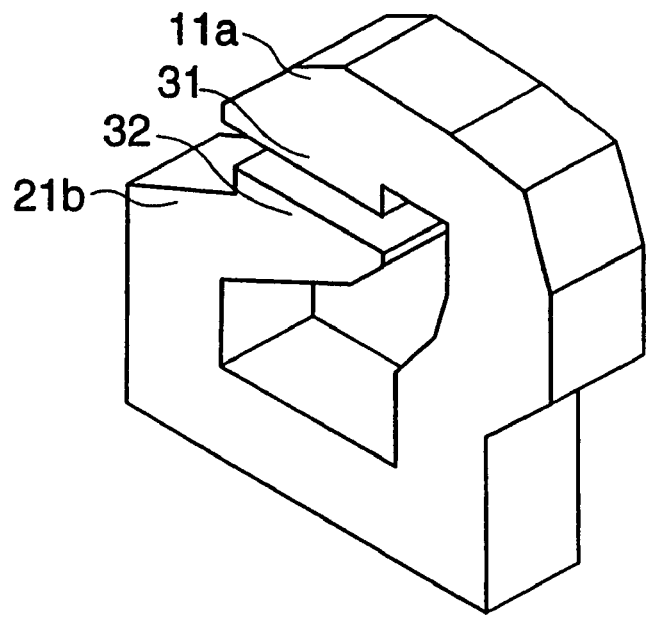
FIGS. 2A and 2B are views showing a construction of an embodiment according to the invention.
Figure 2B:
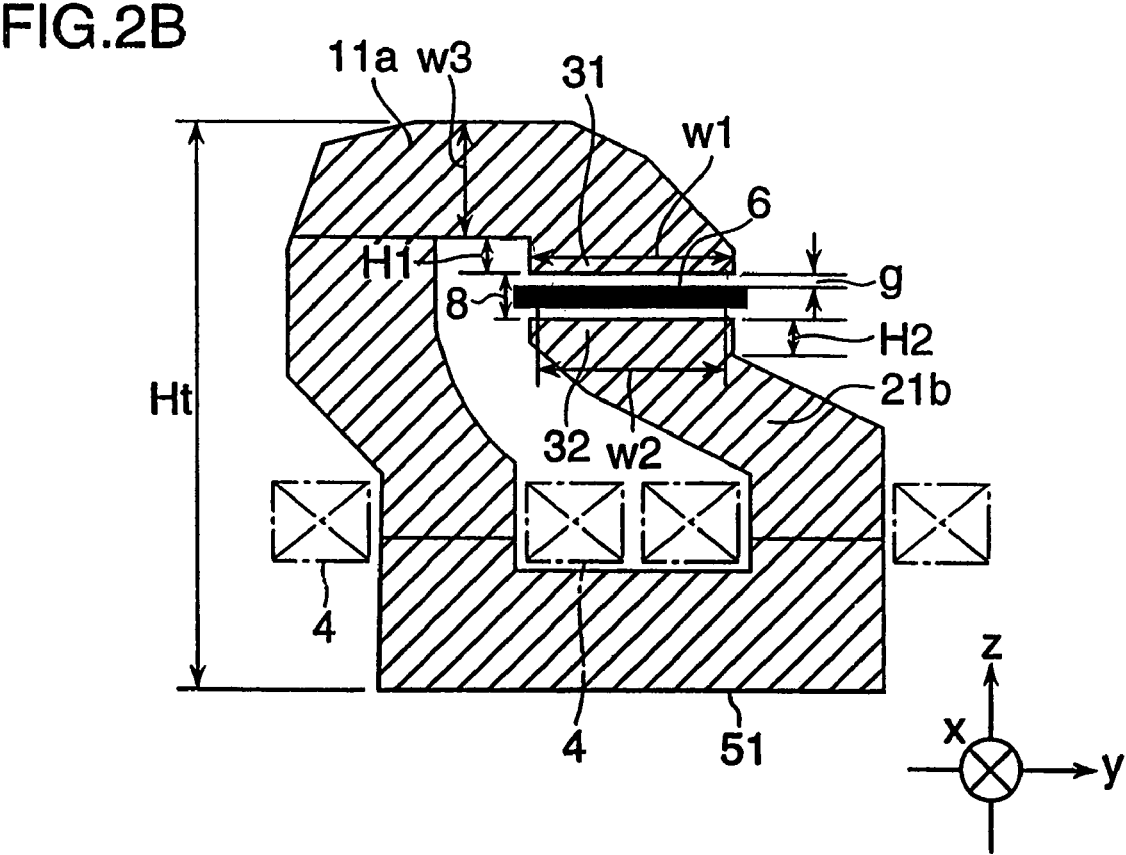

FIG. 2A is a perspective view showing a stationary part used in a first embodiment of the invention, and FIG. 2B is a cross sectional view showing a linear motor according to the first embodiment. The difference from the comparative example is that an upper magnetic pole tooth 11a and a lower magnetic pole tooth 21b of core 51 have step portions 31 and 32 on sides where a gap 8 is present.

Figure 3A:
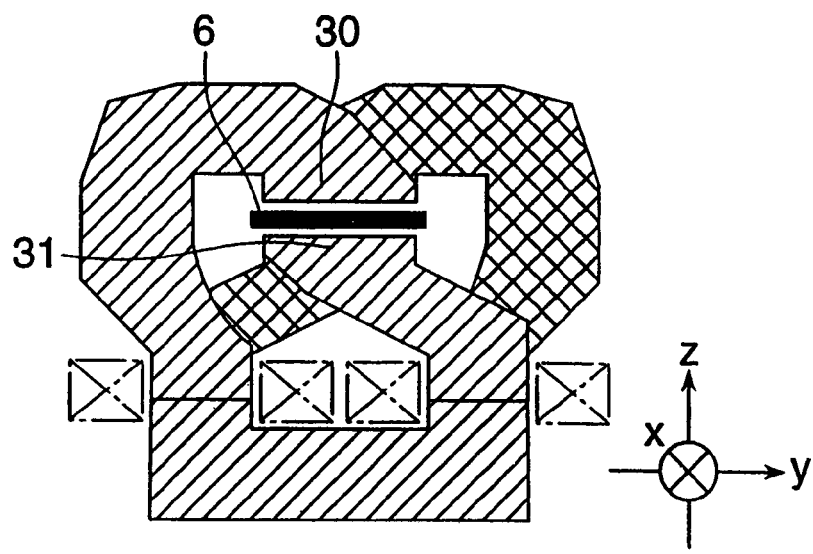
FIGS. 3A–3C are views for illustrating a principle that restoring force is produced in the invention.
Figure 3B:
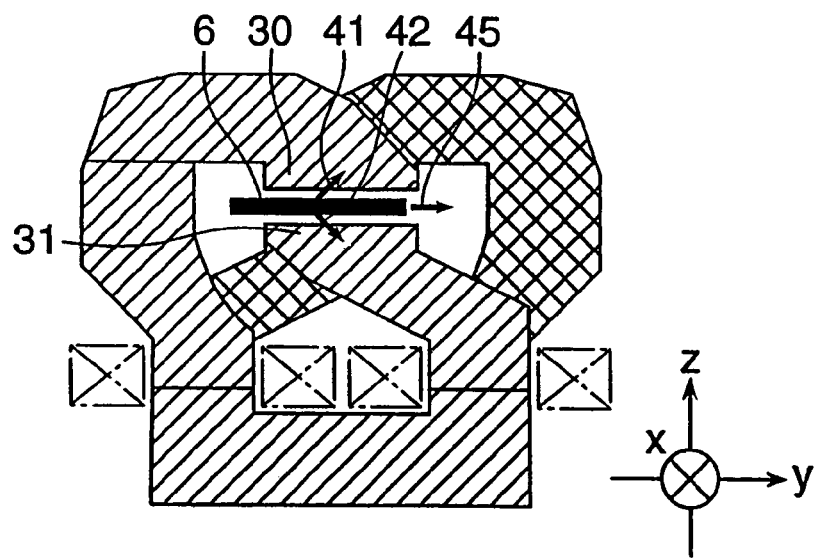
Figure 3C:
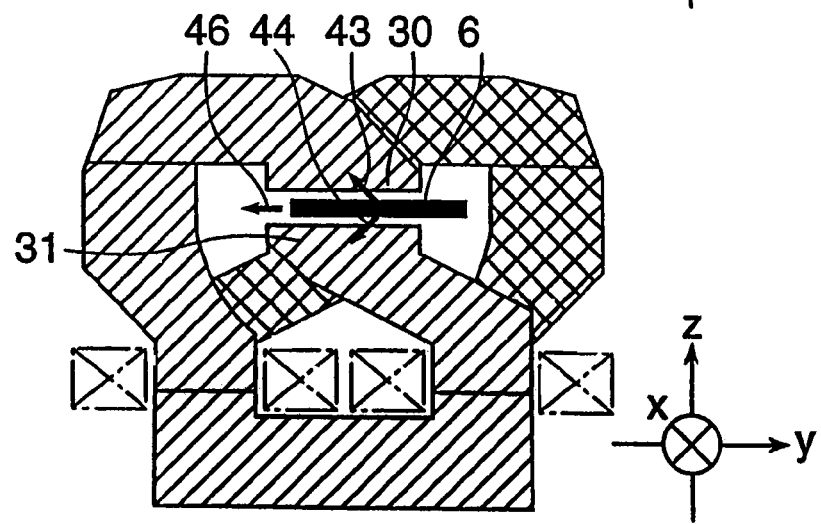

FIGS. 3A and 3B are views illustrating an operation of the first embodiment, FIG. 3A showing a state in which a movable part 6 is located in a reference position. When the movable part 6 is driven so as to be displaced from the reference position toward a negative y-direction as shown in FIG. 3B, electromagnetic forces are generated on the movable part 6 in directions indicated by arrows 41 and 42. Accordingly, a force oriented (in a direction indicated by an arrow 45) to return the movable part 6 toward the reference position is generated in the y-direction. In other words, a restoring force acts on the movable part 6. In the case htat the movable part 6 is displaced from the reference position toward a positive y-direction as shown in FIG. 3C, a restoring force is also generated in a direction indicated by an arrow 46.

Accordingly, since the restoring force acts on the movable part 6 when the movable part 6 is displaced in the y-direction, it is possible to reduce a load applied on the support mechanism for supporting the movable part 6 in the y-direction. Therefore, the support mechanism supporting the movable part 6 can be made simple. Further, since wear caused by friction between the movable part 6 and the support mechanism can be decreased, it is also possible to reduce labor required for maintenance such as replacement of parts and so on, and further to reduce cost for replaced parts expenses and so on.

In the present embodiment, although both the upper magnetic pole tooth 11a and the lower magnetic pole tooth 21b are provided with the step portions, the invention takes effect even when only the upper magnetic pole tooth 11a or only the lower magnetic pole tooth 21b is provided with a step portion. However, it is preferable that both the upper magnetic pole tooth 11a and the lower magnetic pole tooth 21b have the step portions, since a larger restoring force acts on the movable part. In the case that the step portions have a larger width w1 than the width w2 of the permanent magnet arranged in the movable part, there is produced a range in which little restoring force acts on the movable part 6. Accordingly, it is desired that the width w1 of the step portion is substantially equal to or smaller than the width w2 of the permanent magnets. In the case of using an irregular magnetic plate (namely, a magnetic plate having an uneven surface) for the movable part 6 as described later, it is desired that the width w1 of the step portion is smaller than the width of the magnetic plate.

If the step portion has a small height H1, sufficient restoring force cannot be obtained even when the movable part 6 is displaced in the y-direction. Accordingly, it is desired that the height H1 of the step portion is larger than a distance g of an air gap between the movable part 6 and the step portion. Meanwhile, when the height H1 of the step portion becomes too large, the height Ht of the stationary part 3 is increased, so that a frame of the linear motor becomes large. Accordingly, it is desired that the height H1 of the step portion is smaller than the width w3 of the upper magnetic pole tooth 11a.

While the step portion of the embodiment is substantially rectangular in shape, it may be substantially trapezoidal, or the like.

Although the stationary part 3 is a primary side (a side having a core around which a coil is wound) and the movable part 6 is a secondary side in the present embodiment, the invention is applicable to an arrangement in which the stationary part 3 is a secondary side and the movable part 6 is a primary side. In such arrangement, the movable part 6 will have step portions.

In addition, the invention is not limited to the linear motor system according to the above embodiment, but applicable to, for example, a system in which a secondary side is a magnetic plate around which a coil is wound, an irregular magnetic plate (a reluctance motor), a conductor plate (an induction motor) or the like.

According to the invention, it is possible, in a drive unit, to decrease stress generated in a movable part in a horizontal direction and to reduce a load applied on a support mechanism for the movable part.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A linear motor comprising a first member including a plurality of magnetic bodies around which a common coil is wound, and a second member in the form of a flat plate comprising a permanent magnet, wherein the plurality of magnetic bodies comprise first magnetic bodies and second magnetic bodies;

the first magnetic body comprises a first magnetic pole tooth disposed on one side of the second member, and a second magnetic pole tooth disposed on the other side of the second member, the first and second magnetic pole teeth being opposed to each other to form a first gap therebetween;

the second magnetic body comprises a first magnetic pole tooth disposed on said other side of the second member, and a second magnetic pole tooth disposed on said one side of the second member, the first and second magnetic pole teeth being opposed to each other to form a second gap therebetween;

the first and second magnetic bodies are alternately disposed in a relative moving direction of the first and second members so that the second member relatively moves in the first and second gaps;

at least one tooth of each set of said opposing first and second magnetic pole teeth of the first magnetic bodies and the second magnetic bodies has a step portion; and the width of the step portion in a direction perpendicular to the relative moving direction of the first and second members is smaller than the width of the permanent magnet in the same direction.

2. A linear motor according to claim 1, wherein the height of the step portion is bigger than a gap between said step portion and said second member.

3. A linear motor according to claim 1, wherein the height of the step portion is smaller than the width of the permanent magnet.

* * * * *